United States Patent
Prinzhorn et al.

(10) Patent No.: US 12,224,630 B2
(45) Date of Patent: Feb. 11, 2025

(54) ELECTRIC ACTUATOR

(71) Applicant: HANON SYSTEMS EFP DEUTSCHLAND GMBH, Bad Homburg v. d. Höhe (DE)

(72) Inventors: Karl Prinzhorn, Friedberg (DE); Alexander Prophet, Offenbach (DE)

(73) Assignee: HANON SYSTEMS EFP DEUTSCHLAND GMBH, Bad Homburg v. d. Höhe (DE)

(*) Notice: Subject to any disclaimer, the term of this patent is extended or adjusted under 35 U.S.C. 154(b) by 853 days.

(21) Appl. No.: 15/733,916

(22) PCT Filed: Mar. 6, 2019

(86) PCT No.: PCT/EP2019/055554
§ 371 (c)(1),
(2) Date: May 20, 2021

(87) PCT Pub. No.: WO2019/233638
PCT Pub. Date: Dec. 12, 2019

(65) Prior Publication Data
US 2021/0273532 A1    Sep. 2, 2021

(30) Foreign Application Priority Data
Jun. 4, 2018  (DE) .............. 10 2018 208 716.4

(51) Int. Cl.
*H02K 11/33* (2016.01)
*H02K 1/18* (2006.01)
*H02K 5/16* (2006.01)

(52) U.S. Cl.
CPC .............. *H02K 11/33* (2016.01); *H02K 1/18* (2013.01); *H02K 5/16* (2013.01); *H02K 2203/03* (2013.01)

(58) Field of Classification Search
CPC .......... H02K 7/083; H02K 7/116; H02K 5/04; H02K 5/16; H02K 5/02; H02K 11/33; H02K 1/18; H02K 5/10
See application file for complete search history.

(56) References Cited

U.S. PATENT DOCUMENTS 5,969,445 A * 10/1999 Horiuchi ................ H02K 11/33
310/68 C
9,599,217 B2 * 3/2017 Baumgartner .......... F16H 61/26
(Continued)

FOREIGN PATENT DOCUMENTS

CN    104620036 A    5/2015
CN    106415017 A    2/2017
(Continued)

OTHER PUBLICATIONS

JP-6688431-B2 machine translation Sep. 9, 2023.*
(Continued)

*Primary Examiner* — Leda T Pham
(74) *Attorney, Agent, or Firm* — Harness, Dickey & Pierce, P.L.C.

(57) ABSTRACT

The disclosure relates to an electric actuator having an electric motor comprising a rotor which is arranged such that it can rotate about an axis of rotation in a stator housing having an axial installation length. To simplify accommodating the electric actuator in a limited axial installation space, the stator housing is arranged with an axial end in a controller housing and is fastened within the controller housing.

7 Claims, 4 Drawing Sheets

(56) References Cited

U.S. PATENT DOCUMENTS

| | | | |
|---|---|---|---|
| 9,979,268 B2 * | 5/2018 | Sadanaga | G01D 11/245 |
| 10,797,554 B2 * | 10/2020 | Wu | H02K 11/215 |
| 2008/0318724 A1 | 12/2008 | Lott et al. | |
| 2009/0078489 A1 * | 3/2009 | Feier | H02K 7/06 |
| | | | 180/339 |
| 2012/0031215 A1 * | 2/2012 | Feier | H02K 7/1163 |
| | | | 74/473.12 |
| 2012/0286603 A1 | 11/2012 | Suga et al. | |
| 2016/0377082 A1 | 12/2016 | Fecke et al. | |
| 2017/0009771 A1 | 1/2017 | Reul et al. | |

FOREIGN PATENT DOCUMENTS

| | | | | |
|---|---|---|---|---|
| CN | 207363874 U | 5/2018 | | |
| DE | 102006035062 A1 | 1/2008 | | |
| DE | 102007063694 A1 | 9/2010 | | |
| DE | 102013017975 A1 | 6/2015 | | |
| DE | 102013017976 A1 | 6/2015 | | |
| DE | 102015217020 A1 | 3/2017 | | |
| JP | 6688431 B2 * | 4/2020 | | B62D 5/0406 |
| KR | 10-2016-0093044 A | 8/2016 | | |
| KR | 10-2016-0140664 A | 12/2016 | | |
| WO | 2015048957 A2 | 4/2015 | | |
| WO | WO-2015048956 A2 | 4/2015 | | |
| WO | 2015149777 A1 | 10/2015 | | |

OTHER PUBLICATIONS

Office Action for corresponding Chinese Patent Application No. 201980036529.X, dated Nov. 30, 2022.

Korean Office Action regarding Patent Application No. 1020207037979, dated Sep. 22, 2022.

* cited by examiner

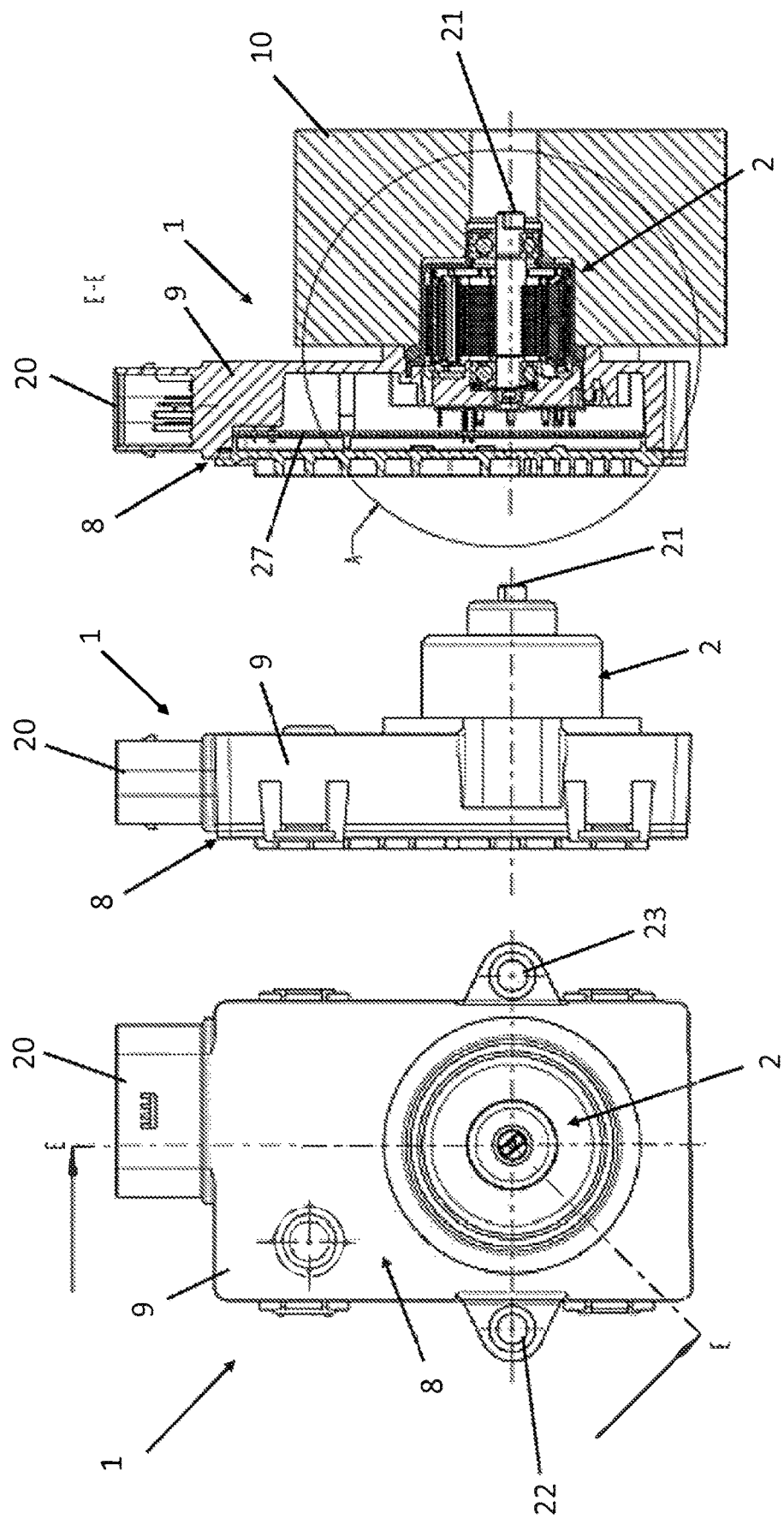

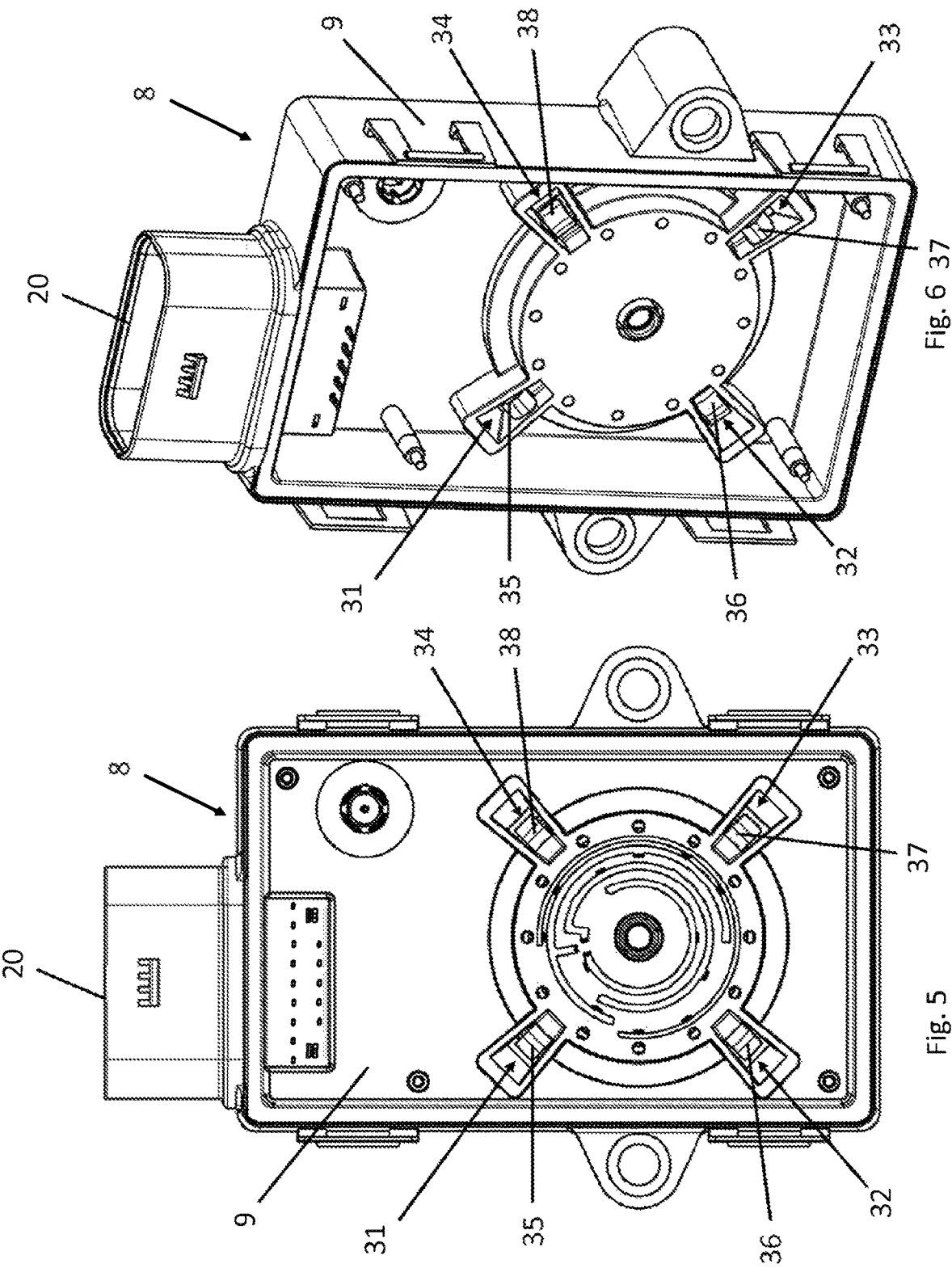

ELECTRIC ACTUATOR

CROSS-REFERENCE TO RELATED APPLICATIONS

This application is a U.S. National Phase Application under 35 U.S.C. 371 of International Application No. PCT/EP2019/055554, filed Mar. 6, 2019, which claims the benefit of German Patent Application No. 10 2018 208 716.4, filed Jun. 4, 2018. The entire disclosures of each of the above applications are incorporated herein by reference.

FIELD

The disclosure relates to an electric actuator having an electric motor comprising a rotor which is arranged such that it can rotate about an axis of rotation in a stator housing having an axial installation length.

BACKGROUND

This section provides background information related to the present disclosure which is not necessarily prior art.

Known from the German laid-open document DE 10 2006 035 062 A1 is an integrated drive element, in particular for use in an automatic transmission, comprising at least one electric motor, preferably precisely two electric motors, and at least one electronic motor control de-vice configured to control the functionality of the at least one electric motor, wherein the at least one motor control device has a housing and wherein the at least one electric motor is spatially directly connected to the housing and/or is integrated into the at least one housing at least in part. Known from the German laid-open document DE 10 2013 017 976 A1 is a liquid pump driven by an electric motor, in particular for the forced lubrication of a manual transmission for motor vehicles, having a housing that can be flange-mounted on a liquid container via a flange surface external to the pump, which has a liquid inlet and a liquid outlet and in which a stator comprising a motor winding and a magnetic rotor for conveying liquid are accommodated, wherein the housing is formed of multiple parts, with a pump housing section which has the liquid inlet and liquid outlet, a stator housing section which holds the stator and which, together with the pump housing section, delimits a liquid chamber in which the rotor is arranged, and a motor housing section which, together with the stator housing section, delimits an electronics chamber in which at least the stator is disposed, and wherein a sealing element is provided, which simultaneously seals the flange surface external to the pump relative to the liquid container, separates the liquid chamber from the electronics chamber and seals the electronics chamber relative to the environment. Known from the German laid-open document DE 10 2015 217 020 A1 is an engine assembly having an electric motor, comprising a motor housing and a first housing shell comprising an electronics unit and formed as an engine mount, to which the motor housing is attached, a second housing shell formed as a cooling cover, and an electronics mount which is sandwiched between the cooling cover and the engine mount, wherein the electronics mount has on the cooling cover side a first circumferential seal which seals a first contact edge formed between the electronics mount and the cooling cover, and wherein the electronics mount has on the engine mount side a second circumferential seal which seals a second contact edge formed between the electronics mount and the engine mount. Known from the German laid-open document DE 10 2007 063 694 A1 is a transmission unit for a motor vehicle, comprising a transmission with a transmission housing, an electric actuator for actuating the transmission, which has an actuator housing, an electric control device for controlling the actuator, a heat sink device which is connected in a thermally conductive manner to the control device, and a heat-insulating layer which is provided between the actuator housing and the heat sink device for thermally insulating the heat sink device from the actuator housing, wherein the actuator housing is connected in a thermally conductive manner to the transmission housing, which is preferably made of metal, or to a part of said transmission housing, wherein parts of the control device are integrated into the heat-insulating layer.

SUMMARY

This section provides a general summary of the disclosure, and is not a comprehensive disclosure of its full scope or all of its features.

The object of the disclosure is to simplify accommodating in a limited axial installation space an electric actuator having an electric motor comprising a rotor which is arranged such that it can rotate about an axis of rotation in a stator housing having an axial installation length.

In the case of an electric actuator having an electric motor comprising a rotor which is arranged such that it can rotate about an axis of rotation in a stator housing having an axial installation length, the object is achieved by the stator housing being arranged with an axial end in a controller housing and being fastened within said controller housing. The electronics for controlling the electric motor are accommodated in the controller housing. Owing to the arrangement of an axial end of the stator housing in the controller housing, the stator is immersed, so to speak, in the controller housing. In this way, a part of the axial installation length of the stator housing can advantageously be accommodated in the controller housing. This has the advantage, inter alia, that the axial installation length of the stator housing, which is disposed outside of the controller housing, can be reduced. Fastening the stator housing inside the controller housing has the advantage that fastening means such as screws are not required in the exterior region. The controller housing effectively protects the fastening of the axial end of the stator housing against corrosion.

A preferred embodiment example of the electric actuator is characterized in that the stator housing comprises a stator pot made of a metal material and is crimped inside the controller housing. To this end, fastening tabs are advantageously formed on an end facing away from a base of the stator pot, which fastening tabs are deformed, in particular bent or crimped, for crimping the stator pot inside the controller housing. As a result, a particularly resilient fastening of the stator pot to the controller housing is facilitated in a simple manner.

A further preferred embodiment example of the electric actuator is characterized in that the stator housing is crimped with a plastic housing body of the controller housing at at least two crimping points, preferably at three or four crimping points. As a result, a particularly resilient fastening of the stator pot preferably made of a metal material to the plastic housing body of the controller housing is facilitated.

In the case of an electric actuator having an electric motor comprising a rotor which is arranged such that it can rotate about an axis of rotation in a stator housing having an axial installation length, in particular with an electric actuator as described previously, the object set out above is alternatively or additionally achieved in that the stator housing is arranged in the axial direction on the one hand within the controller housing and on the other hand within a transmission housing. The electric actuator serves to actuate the shifting of a transmission in a motor vehicle, for example. By accommodating the electric actuator with the stator housing in the controller housing and in the transmission housing, the stator housing, in particular the stator pot made of a metal material, can be very effectively protected against environmental influences.

A further preferred embodiment example of the electric actuator is characterized in that the stator housing is arranged entirely within a cavity which is delimited by the controller housing and the transmission housing. The shape and the size of the cavity are advantageously adapted to the shape of the stator housing. In this way, the available installation space in the transmission housing, which is generally limited, can be optimally utilized.

A further preferred embodiment example of the electric actuator is characterized in that the controller housing comprises an annular body with which the controller housing abuts against an end face of the transmission housing. As a result, an effective seal between the controller housing and the transmission housing is considerably simplified.

A further preferred embodiment example of the electric actuator is characterized in that radially outside the stator housing a sealing device is arranged between the controller housing and the transmission housing. The sealing device can be used for both radial and axial sealing between the controller housing and the transmission housing. Depending on the configuration and arrangement of the sealing device, it may also, however, only be used for axial sealing between the controller housing and the transmission housing.

A further preferred embodiment example of the electric actuator is characterized in that a first bearing for a rotor shaft is arranged inside the transmission housing. The first bearing for the rotor shaft is advantageously provided in the region of a pot base of the stator housing pot. The pot base of the stator housing pot advantageously comprises a central through-hole, through which an end of the rotor shaft projects into the transmission housing. The end of the rotor shaft protruding from the stator pot is coupled to a shifting mechanism in the transmission, preferably via an appropriate coupling means.

A further preferred embodiment example of the electric actuator is characterized in that a second bearing for the rotor shaft is arranged inside the controller housing. The second bearing for the rotor shaft is advantageously arranged in the plastic housing body of the controller housing. Together with the stator housing and the two bearings for the rotor shaft of the rotor, the controller housing constitutes a component which can easily be fastened to the transmission housing, for example with the help of fastening lugs provided on the controller housing.

The disclosure also relates to an electric motor, a stator, a stator housing, in particular a stator pot, a rotor, a rotor shaft, a bearing, a transmission housing and/or a sealing device for an electric actuator as described above. The components mentioned can be operated separately.

DRAWINGS

The drawings described herein are for illustrative purposes only of selected embodiments and not all possible implementations, and are not intended to limit the scope of the present disclosure.

Further advantages, features and details of the disclosure are set out in the description below, in which various embodiment examples are described in detail with reference to the drawings. In the drawings:

FIG. 1 shows a side view of an electric actuator comprising an electric motor having a stator housing;

FIG. 2 shows a side view of the electric actuator from FIG. 1;

FIG. 3 shows the view of a section along a line E-E in FIG. 1;

FIG. 5 shows a rear view of the plastic housing body of a controller housing of the electric actuator from FIGS. 1 to 4, in order to show four crimping points at which the stator housing of the electric motor is fastened to the plastic housing body of the controller housing;

FIG. 6 shows a perspective view of the controller housing from FIG. 5;

Corresponding reference numerals indicate corresponding parts throughout the several views of the drawings.

DETAILED DESCRIPTION

Figure 4:
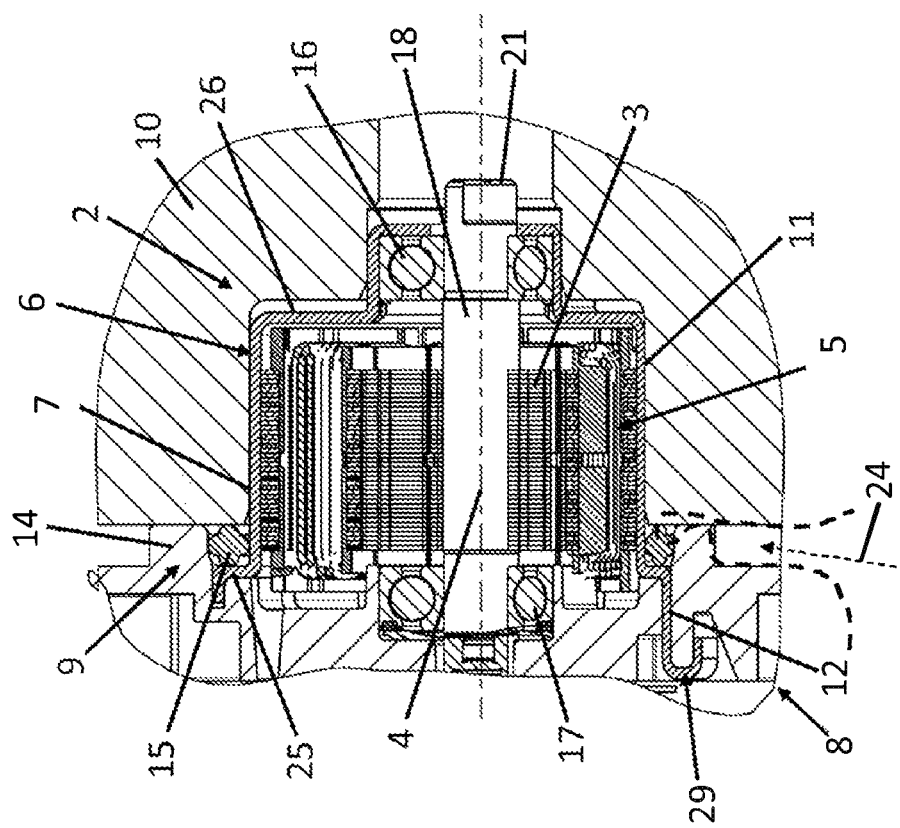
FIG. 4 shows an enlarged view of a detail A from FIG. 3.

Example embodiments will now be described more fully with reference to the accompanying drawings.

In FIGS. 1 to 6 and 8, an electric actuator 1 having an electric motor 2 is shown in various views and sections. The electric motor 2 comprises a rotor 3 which is rotatable about an axis of rotation 4 inside a stator 5.

The stator 5 of the electric motor 2 is arranged in a stator housing 6. The stator housing 6 comprises a stator pot 7 made of a sheet steel material.

The electric actuator 1 also comprises a controller housing 8, which constitutes a local control unit for the electric motor 2 of the electric actuator 1. The controller housing 8 comprises a plastic housing body 9 in which the electric motor 2 with the stator housing 6 is immersed. The stator housing 6 is arranged with an axial end, on the left in FIG. 4, inside the plastic housing body 9 of the controller housing 8 and is also fastened therein.

The axial end of the stator housing 6 of the electric motor 2 shown on the right in FIG. 4 is arranged in a recess 11 of a transmission housing 10. Together with a recess 12 in the plastic housing body 9 of the controller housing 8, the recess 11 of the transmission housing 10 constitutes a cavity 13. The electric motor 2 of the electric actuator 1 is entirely encapsulated within the cavity 13 and is protected against environmental influences. In FIG. 4, a dashed arrow 24 indicates splash water, for example, which appears in a contact region between the transmission housing 10 and the controller housing 8.

The plastic housing body 9 of the controller housing 8 comprises an annular body 14 which abuts against an end face of the transmission housing 10. A sealing device 15 is arranged radially inside the annular body 14. The sealing device 15 has a substantially cross-shaped annular cross section, through which a good seal is ensured in both the radial direction and the axial direction. The term axial refers to the axis of rotation 4 of the rotor 3. Axial means in the direction of or parallel to the axis of rotation 4. Analog means radially transverse to the axis of rotation 4.

The sealing device 15 is arranged in an annular space which is delimited radially on the outside by the annular body 14. Radially on the inside, the annular space is delimited by the stator pot 7. In one axial direction, the annular space in which the sealing device 15 is disposed is delimited by a flange region 25 of the stator pot 7. In the other axial direction, the annular space in which the sealing device 15 is disposed is delimited by the transmission housing 10.

By encapsulating the electric motor 2 in the cavity 13 between the plastic housing body 9 of the controller housing 8 and the transmission housing 10, the electric motor 2, in particular the stator pot 7, can be effectively protected against corrosion. The stator pot 7 comprises on the side facing away from the flange region 25 a pot base 26 which is arranged in the transmission housing 10.

The pot base 26 is provided with a projection in which a first bearing 16 for a rotor shaft 18 of the rotor 3 of the electric motor 2 is accommodated. A second bearing 17 for the rotor shaft 18 is provided in the plastic housing body 9 of the controller housing 8. The pot base 26 of the stator pot 7 is also provided with a central through-hole through which a shaft end 21 protrudes from the stator pot 7. The shaft end 21 is used for coupling with a shifting element (not shown) in a transmission of the transmission housing 10.

It can be seen from FIG. 3 that a circuit board 27 is arranged in the controller housing 8. The electric motor 2 in the controller housing 8 is controlled by means of this circuit board 27. The plastic housing body 9 of the controller housing 8 is sealed by means of a cover 19 on the side facing away from the transmission housing 10. The cover 19 is made of a sheet metal material, for example, in particular an aluminum sheet material. The controller housing 8 comprises on the upper side thereof in FIGS. 1 to 3 a connector 20. The connector 20 serves to connect an electrical supply line and/or to connect control lines.

It can be seen from FIG. 1 that two fastening lugs 22, 23 are arranged on the sides of the controller housing 8. The fastening lugs 22, 23 are integrally connected to the plastic housing body 9 of the controller housing 8. The fastening lugs 22, 23 are advantageously provided with steel bushings. The controller housing 8 with the electric motor 2 can be fastened to the transmission housing 10 through the fastening lugs 22, 23 with the help of appropriate fastening screws.

In FIG. 4, a crimping 29 can be seen, by means of which the stator pot 7 of the stator housing 6 is fastened to the plastic housing body 9 of the controller housing 8.

It can be seen from FIGS. 5 and 6 that the stator pot 7 of the stator housing 6 is firmly fastened to the plastic housing body 9 of the controller housing 8 at a total of four crimping points 31 to 34. Fastening tabs 35 to 38, which are integrally connected to the stator pot 7, are used for the crimping. The fastening tabs 35 to 38 are bent or crimped to fasten the stator pot 7 to the controller housing 8.

Figure 8:
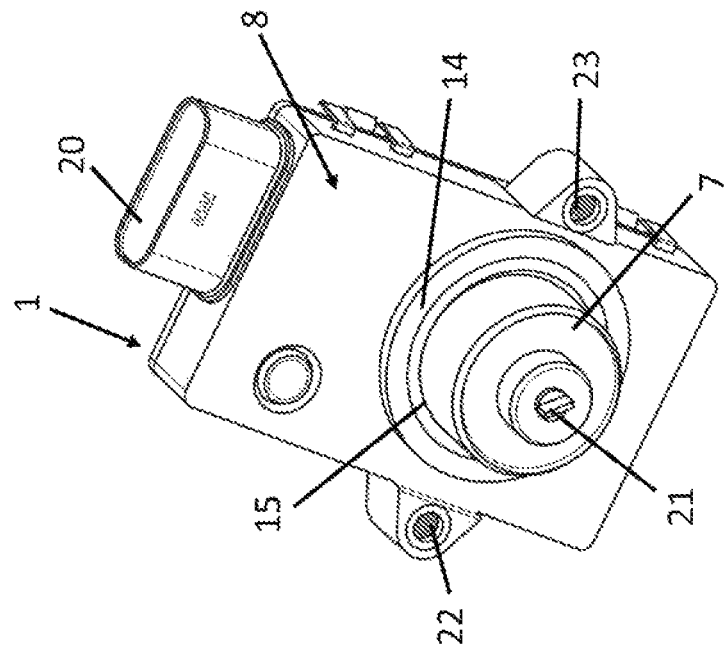
FIG. 8 is a similar simplified view of the electric actuator from FIGS. 1 to 6 compared with FIG. 7.
Figure 7:
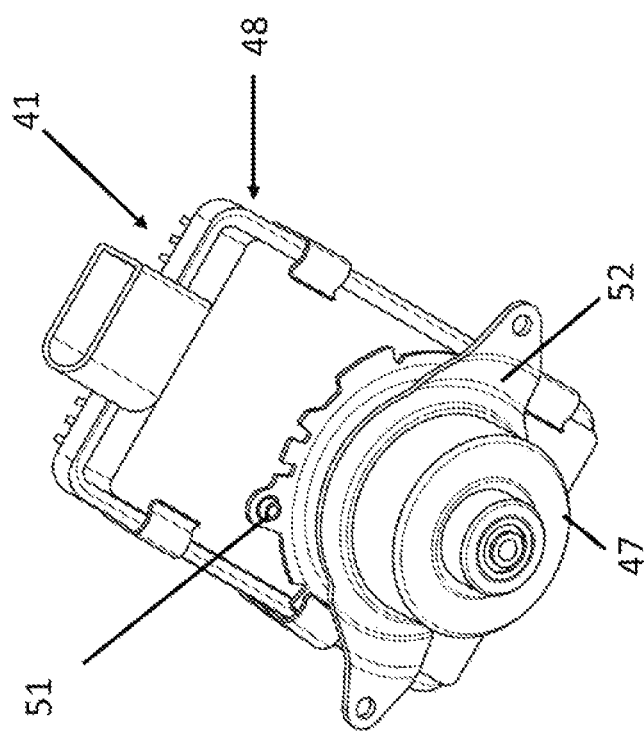
FIG. 7 shows a simplified perspective view of a conventional electric actuator.

FIG. 7 shows a perspective view of a conventional electric actuator 41, as compared with the perspective view of the electric actuator 1 in FIG. 8. The electric actuator 41 comprises a stator pot 47 and a controller housing 48. The stator pot 47 is made of a sheet steel material. Steel parts of the stator pot 47 are exposed to external environmental influences. There is therefore a risk of corrosion. The stator pot 47 is fastened to the controller housing 48 with the help of screw connections 51. A welded blank holder 52 is used for fastening to a transmission housing that is not shown in FIG. 7.

In the case of the electric actuator 1 shown in FIG. 8, all of the steel parts are completely protected against external environmental influences. A high-quality coating of the stator pot 7 is therefore unnecessary. Crimping the stator pot 7 to the controller housing 8 has the advantage that screw connections are not required for fastening the stator pot 7. The blank holder (52 in FIG. 7) is substituted by the fastening lugs 22, 23 on the plastic housing body 9.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. An electric actuator having an electric motor comprising a rotor which is arranged such that it rotates about an axis of rotation in a stator housing having an axial installation length, wherein the stator housing is arranged with an axial end in a controller housing and is fastened within the controller housing,
wherein the stator housing comprises a stator pot including a flange region and a pot base, wherein the pot base is positioned on a side facing away from the flange region, the stator housing is arranged in the controller housing at the axial end and in a transmission housing at an opposite axial end, the stator housing is arranged entirely within a cavity which is delimited by a recess of the controller housing and a recess of the transmission housing such that the stator pot is encapsulated within the cavity, wherein the electric actuator further comprises a first bearing for a rotor shaft of the rotor, the first bearing being positioned in the pot base.

2. The electric actuator according to claim 1, wherein the stator pot is made of a metal material and the stator housing is crimped inside the controller housing.

3. The electric actuator according to claim 1, wherein the stator housing is crimped with a plastic housing body of the controller housing at at least two crimping points.

4. The electric actuator according to claim 1, wherein the controller housing comprises an annular body with which the controller housing abuts against an end face of the transmission housing.

5. The electric actuator according to claim 1, wherein radially outside the stator housing a sealing device is arranged between the controller housing and the transmission housing.

6. The electric actuator according to claim 1, wherein a second bearing for the rotor shaft is arranged inside the controller housing.

7. The electric motor, stator, stator housing, rotor, rotor shaft, bearing, transmission housing and/or sealing device for an electric actuator according to claim 1.

* * * * *